J. W. HYATT.
APPARATUS FOR COLD ROLLING SHAFT BARS.
APPLICATION FILED AUG 25, 1916. RENEWED FEB. 7, 1919.
1,302,558.
Patented May 6, 1919.
4 SHEETS—SHEET 1.
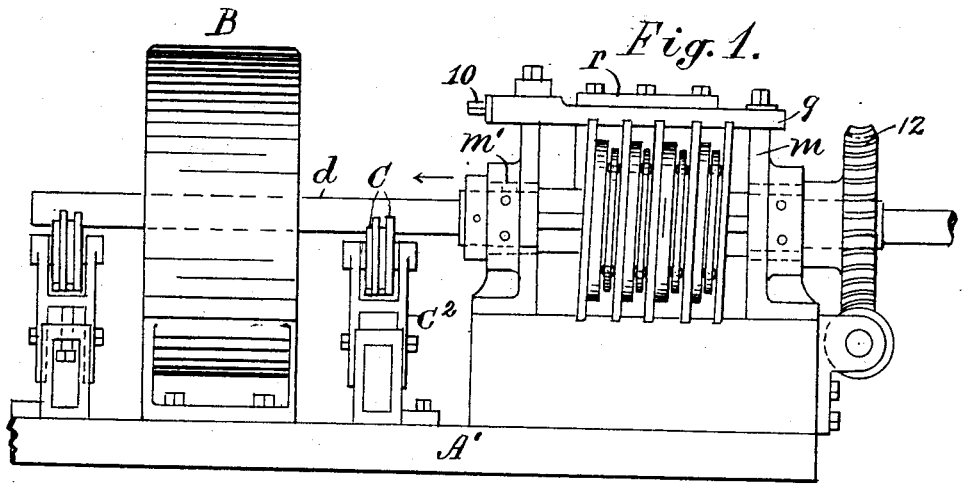
  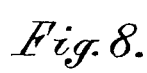 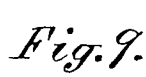
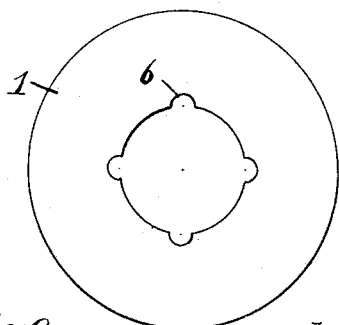 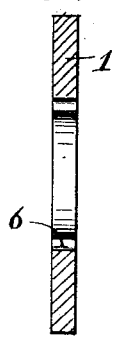 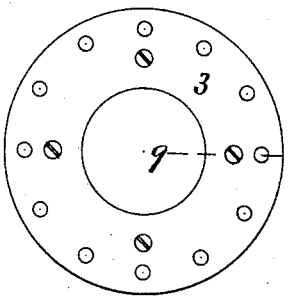 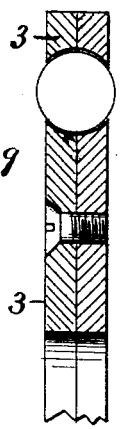
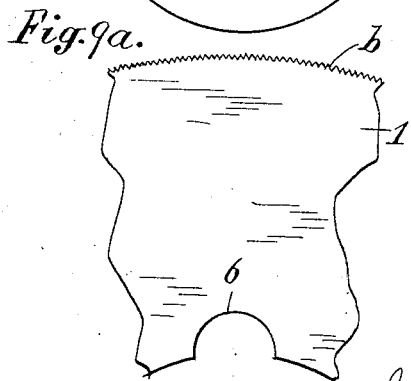 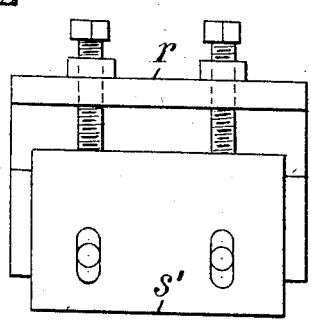

J. W. HYATT.
APPARATUS FOR COLD ROLLING SHAFT BARS.
APPLICATION FILED AUG. 25, 1916. RENEWED FEB. 7, 1919.
1,302,558.
Patented May 6, 1919.
4 SHEETS—SHEET 2.
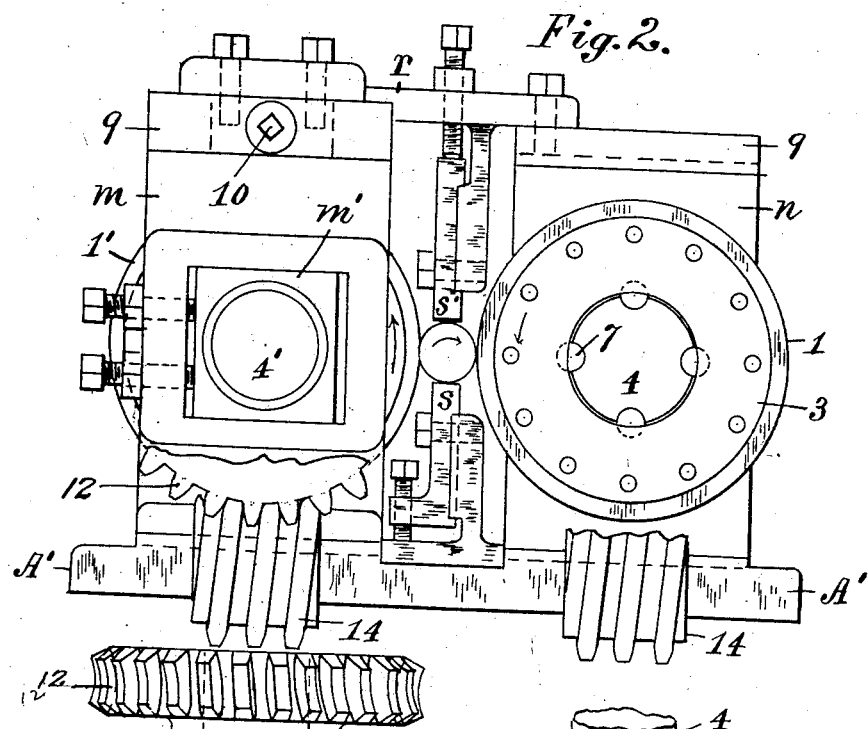
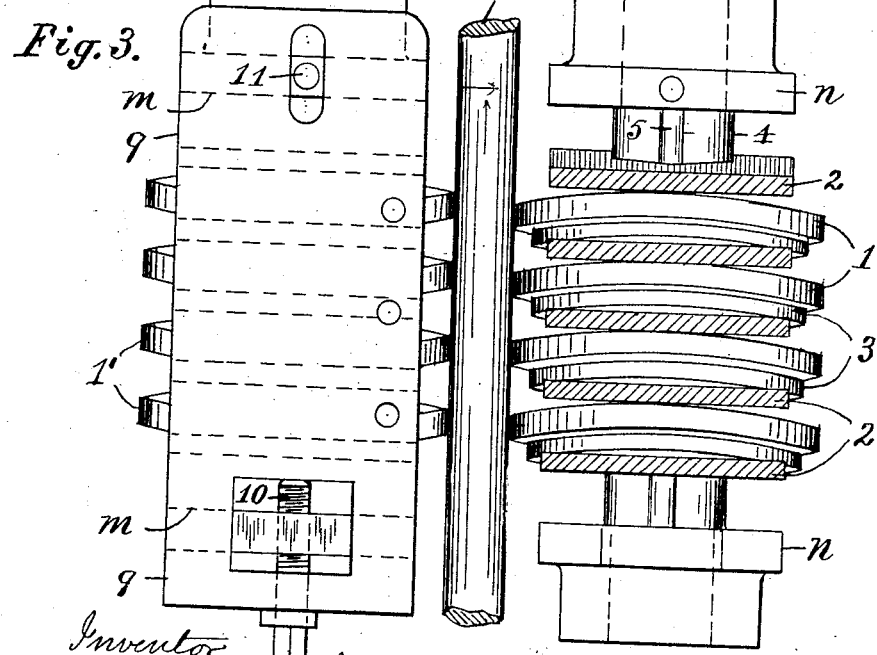

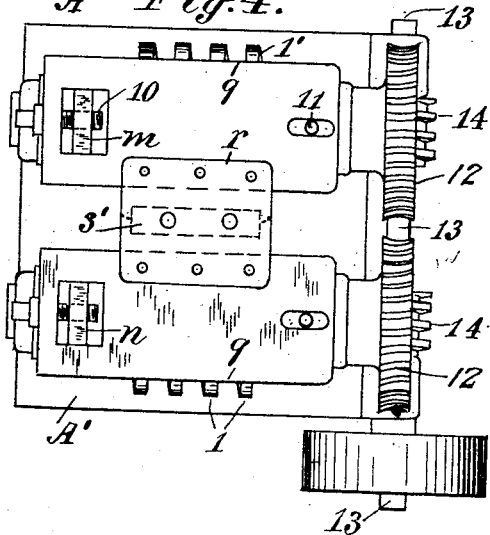
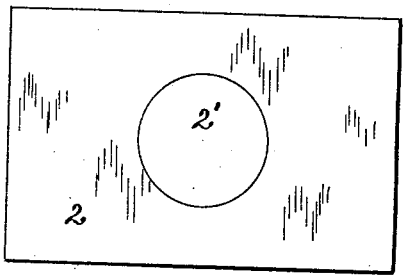
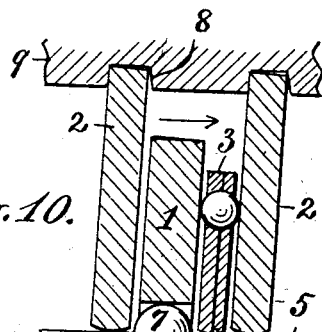
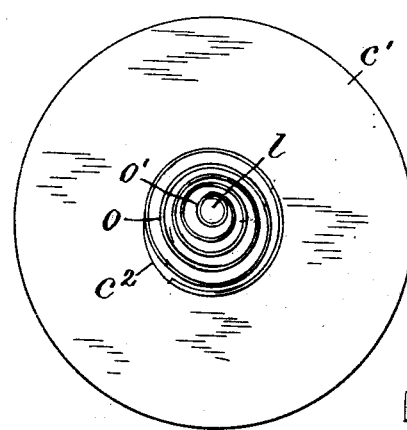
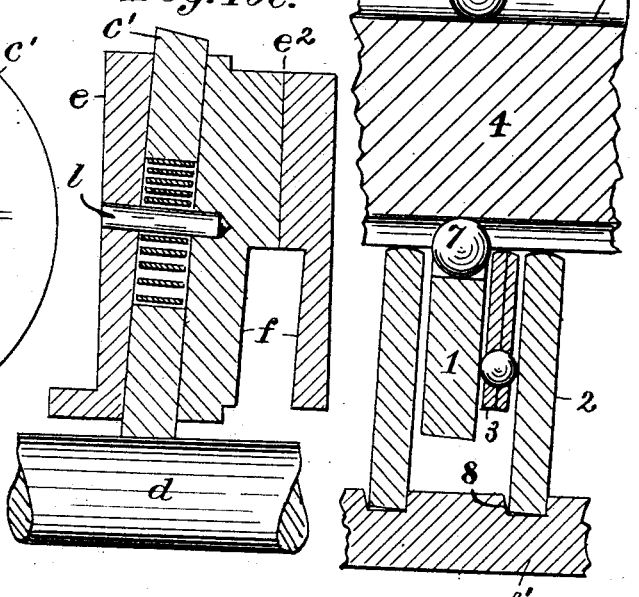
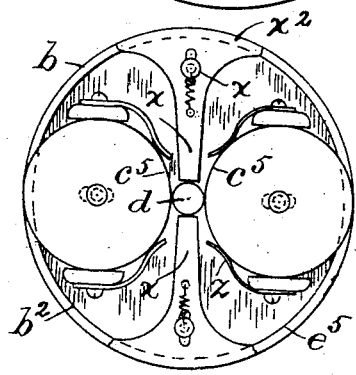

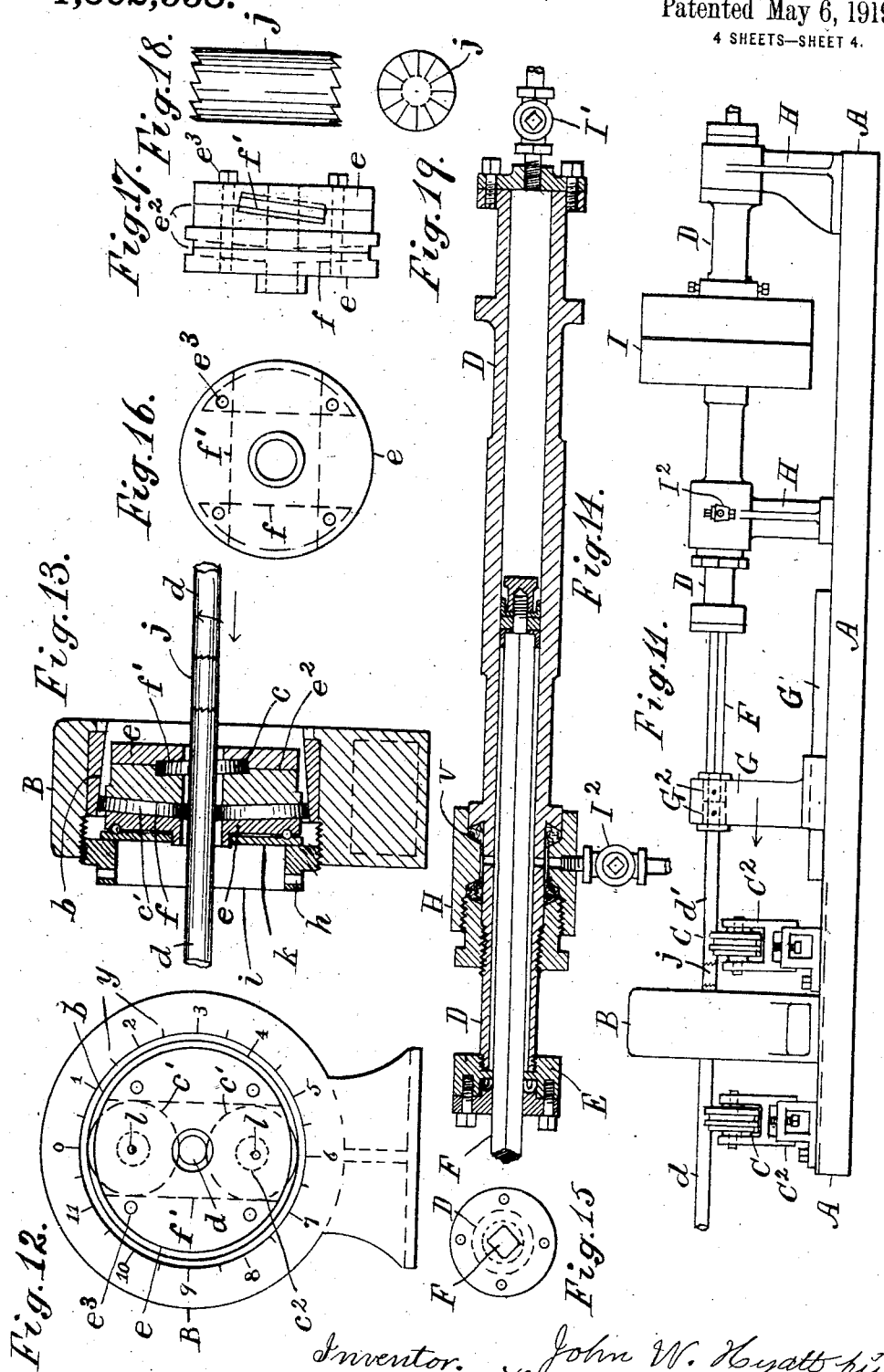

UNITED STATES PATENT OFFICE.

JOHN WESLEY HYATT, OF EAST ORANGE, NEW JERSEY.

APPARATUS FOR COLD-ROLLING SHAFT-BARS.

1,302,558. Specification of Letters Patent. Patented May 6, 1919.

Application filed August 25, 1916, Serial No. 116,765. Renewed February 7, 1919. Serial No. 275,678.

*To all whom it may concern:*

Be it known that I, JOHN W. HYATT, a citizen of the United States, residing at 92 Rutledge avenue, East Orange, New Jersey, county of Essex, have invented certain new and useful Improvements in Apparatus for Cold-Rolling Shaft-Bars, fully described and represented in the following specification and the accompanying drawings, forming a part of the same.

The present invention relates to a cold-rolling mill for reducing a shaft-bar by a spiral-rolling operation, in which the shaft is rotated and fed forward.

In the present invention the reducing-rolls are of disk-form, set transverse to the axis of the shaft, and have the shape of conical frusta, and are surrounded by a conical annular steel seat or bed within the reducing-head.

They are held in a definite position within the bed by a cage consisting of collars having recesses fitted to the ends of the roller-disks, and such cage is adjustable longitudinally within the conical bed so as to bring the roller-disks of each pair into greater or less proximity to one another and thus reduce the shaft in a greater or less degree.

Such adjustability of the disks to and from one another, with a continuous rigid support formed by the surrounding bed, enables the disks to operate upon shafts varying considerably in diameter. If the disks be made materially greater in diameter than the shaft they operate more effectively to compress the surface of the shaft, instead of raising a wave upon its surface which tends to produce a laminated structure; but the shaft-bar can not be wholly surrounded in the same plane by three or more disks of a diameter much greater than that of the shaft-bar.

To permit the employment of disks materially larger than the shaft-bar, I employ disks in pairs, with the disks of each pair opposite one another, so as to sustain the shaft rigidly during the rolling operation.

The cage is constructed to support two such pairs of disks, bearing upon opposite quadrants of the shaft, so that the shaft is supported upon four points and reduced by four rolls in its passage through the reducing-head. More pairs of disks may be used if required.

To avoid friction, and to facilitate the feeding of the shaft through the disks, their axes are set at a slight inclination to the axis of the shaft, so that the shaft is moved lengthwise in its rotation between the disks.

The invention also includes means for straightening the shaft during the reducing operation, by bearing-rolls arranged adjustably at opposite sides of the reducing-head.

The invention will be understood by reference to the annexed drawing, in which Figure 1 is a side elevation of an apparatus having an inclined wheel feed;

Fig. 2 is an end elevation of the same with the stanchion omitted upon the right-hand side;

Fig. 3 is a plan of the same with the cap-plate removed from the right-hand side, and the body of the upper guide omitted;

Fig. 4 is a plan of the feeding apparatus shown in Fig. 1;

Fig. 5 is a perspective view of one of the driving shafts;

Fig. 6 is an elevation of one of the feed-wheels;

Fig. 7 is a diametrical section of the feed-wheel;

Fig. 8 is a side view of one of the thrust-collars;

Fig. 9 is a section of the same enlarged, on line 9—9 in Fig. 8;

Fig. 9$^a$ shows a segment of one of the feed-wheels with a hardened and roughened periphery;

Fig. 9$^b$ is a side view of the upper guide for the feed mechanism;

Fig 10 is a longitudinal section of part of a driving-shaft and two of the thrust-plates with a thrust-collar and a feed-wheel between the same;

Fig. 10$^a$ is a side view of one of the thrust-plates;

Fig. 10$^b$ is a side view of one of the reducing-disks and its centering spring;

Fig. 10$^c$ shows a portion of the cage in section through one of the rolls $c'$;

Fig. 10$^d$ shows an alternative construction;

Fig. 11 is a side elevation of an apparatus having a rotating hydraulic pusher for rotating the shaft-bar, and simultaneously feeding it through the reducing-head;

Fig. 12 is an end elevation of the reducing-head;

Fig. 13 is a central section of the same with the shaft-bar therein;

Fig. 14 is a horizontal central section of the hydraulic-cylinder of Fig. 11, drawn upon a larger scale than Fig. 11;

Fig. 15 shows the piston-rod end of the hydraulic cylinder, also enlarged;

Fig. 16 is a side view of the cage for the reducing roll-disks, on the same scale as Fig. 13;

Fig. 17 is an edge view of the same;

Fig. 18 is a side view of the shaft-driving coupler;

Fig. 19 is an end view of the same;

Figs. 18 and 19 are drawn upon a much larger scale than Fig. 13, to show the construction of the coupler clearly.

In Figs. 1 to 9, A is a base-plate sustaining a fixed reducing-head B, and a straightening means which consists of bearing-rolls C mounted in adjustable stands $C^2$ at opposite sides of the head B. These stands are adjustable to support the shaft-bar a little above, or eccentrically to the center of the head B, which produces a constant bending of the shaft as it rotates, and operates to straighten it in a well known manner.

The stands $C^2$ are adjustable to and from the head B to operate effectively upon shafts of different diameters.

The reducing-head is shown in Figs. 12 and 13 with a tapering annular bed $b$, roll-disks $c$, $c'$ fitted between the bed and the shaft-bar $d$, and a cage $e$ consisting of collars rotatable about the shaft-bar, having oblique slots $f$, $f'$ to fit the flat ends and the edges of the disks. The disks are disposed in pairs at opposite sides of the shaft-bar. The bed $b$ is of hardened steel.

The slots $f$, $f'$ are transverse to the axis of the shaft-bar and at right angles to one another, and each slot carries two of the roll-disks one at each side of the shaft-bar. These four disks are thus disposed to compress the shaft-bar upon four quadrants simultaneously, which tends to center the shaft-bar and produce a perfectly cylindrical form.

The roll-disks are beveled on their edges with one-half the taper of the seat $b$, as shown in Fig. 3, so as to equally fit the seat and the shaft-bar; and they are set at a slight inclination to the ends of the cage, as shown in Figs. 13 and 17, so that the rotation of the shaft-bar within the same operates to feed the bar longitudinally through the head.

To facilitate the formation of the doubly inclined seats in the slots of the cage, I divide it transversely on lines $e^2$, shown in Figs. 13 and 17, so that the cage is formed of three collars secured together by bolts $e^3$.

The part between the lines $e^2$ has recesses in its opposite faces to form the slots $f$, $f'$. The parts outside the lines $e^2$ have corresponding recesses to fit the flat sides of the disks $c$, $c'$, and their edges contact with the edges of the slots, as shown in Fig. 12. Each of the disks is thus inclined in two directions, the inclination of the rolls $c'$ in Fig. 13 adapting them to contact equally with the shaft-bar $d$ and the bed $b$, while the inclination of the disk $c$ shown in Fig. 17 sets it obliquely to the axis of the shaft-bar so as to feed the same forward when the shaft is rotated. The three parts of the cage are held together by bolts $e^3$.

In Fig. 13, the disk $c$ upon the farther side of the shaft-bar $d$ is shown at a certain oblique angle to the shaft-bar; but in Fig. 17 the slot for the disk upon the nearer side of the shaft is shown, and it will be observed that such disks and slots are oblique to the shaft in reverse directions, which enables both the disks $c$ to have the same propelling effect upon the shaft-bar.

Each of the disks has a central hole $c^2$ shown in Figs. $10^b$ and $10^c$, and a pin $l$ is inserted across the slot $f$ or $f'$ a little outside the center line of the disk. A spiral spring ribbon $o$ like a clock-spring, is wrapped loosely about the pin and coiled within the hole $c^2$; pressing expansively against the side of the hole with sufficient force to sustain the weight of the disk in the slot.

As the disk rotates, the center eye $o'$ of the spring rotates upon the pin $l$, and the eccentric disposition of the pin $l$ in relation to the disk causes the spring to constantly exert a pressure upon the disk outwardly from the shaft-bar; thus holding the opposite disks with their adjacent edges separated, to facilitate the introduction of the shaft-bar between the same.

A gage-block $i$ is shown screwed into one side of the head B at the larger end of the tapering-seat $b$, and a ball-bearing-plate $k$ is fitted between the end of the gage-block and the end of the cage so that the adjustment of the gage-block operates to vary the position of the cage and the disks within the seat $b$. The outer end of the block has radial holes $h$ in which a spanner or hand-bar can be inserted to turn the block when required. The ball-bearing-plate permits the rotation of the cage without resistance when the disks $c$ and $c'$ are rotated by the shaft-bar. The tapering seat $b$ may be made of any length desired. The mounting of the reducing-disks within a tapering seat permits considerable adjustment of the disks radially so that the same apparatus can cross-roll shafts varying considerably in diameter without any other change than the mere adjustment of the cage by the block $k$.

When the shaft-bar under treatment has passed beyond reach of the feeding appliances it may be propelled through the reducing-head by inserting a shaft-driving coupler between the rear end of said shaft-bar and the rotary driver, whether it be a succeeding shaft, as represented in Fig. 1, or a rotary driving-bar $d'$, as shown in Fig. 11. The coupler shown at $j$ in Figs. 18 and 19, is shown in Figs. 1, 11 and 13 inserted between a shaft-bar and a shaft-driver to transmit the required motion to the shaft-bar.

The shaft-driver coupler is formed with sharp radial teeth upon its opposite ends, as shown in Fig. 18, and the forward pressure of the shaft-driver engages the coupler with both the driver and the driven shaft-bar, when it is inserted between the adjacent ends of the same.

It will be observed that I employ reducing-disks in pairs, to permit the use of much larger disks than is possible where more than three are applied to the shaft-bar in the same plane; and so as to compress the shaft-bar at more than merely opposite points I make the cage to sustain at least two pairs of disks carried in slots $f$, $f'$, at right angles to one another, and both disks in each pair have the same oblique relation to the shaft-bar.

It will be understood that my reducing-disks have no axles, but are held in their working position exclusively by the cage, and do not impose any material strain on the cage, as the cross-rolling strain is transmitted directly to the seat $b$.

The preferred device for rotating and propelling the shaft-bar through the reducing-head B is shown in Figs. 1 to 10 inclusive, and consists of feed-wheels 1, 1', pressed upon the opposite sides of the shaft-bar in pairs, and rotated by suitable means so that their contact rotates the shaft bar. Four pairs of the feed-wheels are shown in the drawing. These feed-wheels are set obliquely to the axis of the shaft-bar and their rotation thus causes the shaft-bar to advance. Fig. 9ᵃ shows the wheel-rim cross-grooved, to drive the bar $d$ effectively. To sustain the backward thrust upon the edges of the feed-wheels, each of them is supported by a thrust-plate 2 held in the frame of the machine intermediate to the successive feed-wheels. A thrust-ring 3 carrying anti-friction balls is located between each of the feed-wheels and its thrust-plate 2. The opposite feed-wheels of each pair are fitted loosely to the driving-shafts 4 and 4'.

The shafts are journaled in stanchions $m$ and $n$ upon opposite sides of the shaft-bar, the stanchions $m$ having boxes $m'$ adjustable therein to support the shaft 4' so that it may be moved toward or from the shaft 4, and the feed-wheels thus adjusted to operate upon shaft-bars of different sizes. The shafts 4 and 4' are made very large in proportion to their length so as to possess great stiffness, and thus afford the feed-wheels the necessary support in pressing and driving the shaft-bar. The direction of motion in the different parts is indicated by arrows.

The shafts are formed longitudinally with grooves 5, as shown in Figs. 2 and 5, and each of the feed-wheels furnished with corresponding notches shown at 6 in Fig. 6.

By this arrangement, balls 7, shown in Figs. 2 and 10, may be inserted in the notches 6 and grooves 5, which serve as keys to connect the feed-wheels with the driving-shaft while permitting them to be tipped at various angles to feed the shaft-bar as desired.

Such tipping is regulated by the mounting of the thrust-plates 2, which are fitted at their upper and lower ends, as shown in Figs. 1 and 10, in notches 8 formed in the bed A' and the cap 9.

The cap 9 is adjustable lengthwise, and each of the thrust-plates has a hole 2' through the center to clear the driving shaft 4 or 4'. The cap is adjusted lengthwise by a screw 10 and held, when adjusted, by a clamp-screw 11, and its adjustment determines the angle at which the thrust-plates support the feed-wheels in an oblique relation to the shaft-bar.

To hold the shaft-bar between the adjacent edges of the feed-wheels, adjustable guides $s$ and $s'$ are supported above and below the shaft-bar, as shown in Fig. 2, the lower guide being supported upon the bed A', and the upper guide having a foot $r$ by which it is supported upon the caps 9. These guides are adjustable by suitable screws to support shafts of various diameters.

The shafts 4 and 4' are provided with worm-wheels 12 shown in Figs. 3 and 4, and a part of one is also shown in Fig. 2. A worm-shaft 13 is provided with worms 14 which operate upon the worm-wheels and turn the driving-shafts and feed-wheels simultaneously.

With this apparatus a series of shaft-bars may be cold-rolled by feeding them successively through the feeding-wheels and the reducing-head B, the coupler $j$ being inserted, as shown in Fig. 13, between the rear end of the first bar and the front end of the succeeding bar, when the first bar has passed beyond the feeding-wheels.

Figs. 11, 14 and 15 show, however, a rotary pusher which is adapted to push shaft-bars singly and successively through the reducing-head. This pusher is actuated by a hydraulic cylinder D mounted to revolve in bearings H in line with the axis of the reducing-head, and having its plunger or rod F swiveled in a pusher-guide G which is fitted to ways G' upon the bed A.

The plunger F is shown square and carried through a square stuffing-box E upon the end of the hydraulic cylinder to be rotated thereby, and the cylinder is rotated by a pulley I. A pusher-rod $d'$ is connected to the plunger F and is made long enough to push the shaft-bar $d$ through the head B; the coupler $j$ being used to transmit the rotary motion from the pusher-rod to the shaft-bar.

The adjacent ends of the pusher-rod and shaft-bar may, if needful, be indented by a suitable punch to fit the teeth upon the ends of the coupler. The cylinder and pusher-rod are shown shorter than would be required in practice.

The rod F is swiveled in the guide G by a bushing $G^2$ to one end of which it is attached, the pusher-rod $d'$ being secured to the opposite end of the same bushing.

The ends of the cylinder D are connected by cocks $I'$ and $I^2$ with waste-pipes or pipes supplying fluid under pressure, as may be required, to actuate the hydraulic plunger.

With this rotary pusher the oblique position of the disks $c$ and $c'$ within the head B regulates or controls the advance of the shaft-bar, and it is thus kept in contact with the disks for a sufficient time to be effectively reduced thereby. Any suitable feeding-device may be used in connection with the head B constructed as herein described.

Instead of using two pairs of reducing disks, a single pair may be used if guides are provided which bear upon the shaft-bar intermediate to the bearing points of the disks, so as to center the shaft-bar in the head B.

Such a construction is shown in Fig. $10^a$, where the disks are marked $c^5$ and the intermediate guides are marked $x$. Springs $z$ press the disks normally outward.

A circle $b$ is shown to indicate the seat which supports the outer thrust of the disks, and the latter are shown mounted upon a cage consisting of a plate $b^2$ which would be provided with oppositely inclined seats to hold the rolls in an oblique relation to the shaft-bar.

The guides $x$ are also held movably upon the disk by bolts $x'$ and are provided at their outer ends with curved segments to bear upon the seat $b$. Springs $x'$ press them normally outward.

It should be understood that three rolls operating upon a shaft-bar in the same plane cannot produce a round shaft, but that four rolls operating upon quadrants of the shaft will produce the desired result, as also two rolls if operated in connection with intermediate guides for the shaft-bar, as shown at $x$ in Fig. $10^d$. In that figure, the outer ends of the guides bear upon the same seat as the rolls, and they are formed with the same space between them as between the rolls, so as to fit the shaft-bar closely; and with such construction the guides are pressed together simultaneously with the adjacent surfaces of the roll-disks, when the cage is advanced into the conical seat $b$ by the gage-block $k$.

In Fig. 12, index marks $y$ are shown formed upon the side of the head B into which the gage-block $k$ is screwed, and the gage-block, which is not shown in Fig. 12, would be furnished with an index-mark or pointer by which its relation to the index could be read; and such index and pointer permit the adjustment of the gage-block to set the cage most accurately within the tapering seat $b$; and the graduations may be so proportioned as to indicate an advance of the roll-disks toward one another equal to one one-thousandth of an inch, or any other standard measurement.

By this arrangement the cage can be adjusted to vary the action of the disks upon the shaft-bar in any desired degree.

Having thus set forth the nature of the invention what is claimed herein is:

1. A head for the cold-rolling of shafting, having a series of conical roll-disks disposed about a central axis with their axes inclined in two directions to operate spirally upon the surface of the shafting, an annular bed surrounding the rolls to sustain the entire thrust of the same, and collars fitted to the ends of the roller-disks, to hold the disks in their inclined position when in operation, and arranged to rotate within the head, substantially as herein set forth.

2. A head for the cold-rolling of shafting, having a series of conical roll-disks disposed about a central axis with their axes inclined in two directions to operate spirally upon the surface of the shafting, an annular bed surrounding the rolls to sustain the entire thrust on the same, and collars fitted within the head, and formed with oblique seats fitted to the flat ends of the disks to rotate about the central axis with the disks.

3. In a head for the cold-rolling of shafting, the combination, with a ring forming the exterior of the head and having an internal conical bed, of a pair of collars adjustable longitudinally within the conical bed and having upon their adjacent sides opposed recesses containing parallel obliquely disposed seats, conical roll-disks fitted between such seats, and having a taper one-half that of the conical bed, and means for moving the collars longitudinally upon the bed to vary the central aperture between the roll-disks, as and for the purpose set forth.

4. A head for the cold-rolling of shafting, having a series of conical roll-disks with diameter greater than their thickness disposed in pairs about a central axis, with their adjacent edges parallel to the shaft and their axes inclined to the axis of the shaft to operate spirally upon the same, an annular bed surrounding the disks to sustain the entire thrust of the same, and collars embracing the shaft within the head and formed with oblique seats fitted to the flat ends of the disks, and rotated about the central axis with the disks.

5. In an apparatus for the cold-rolling of shafting, the combination, with a head having an internal conical bed, of a pair of collars adjustable longitudinally within the conical bed and having upon their adjacent sides opposed recesses containing parallel obliquely disposed seats, conical roll-disks fitted between such seats, and having a taper one-half that of the conical bed, means for securing the collars together, and means for adjusting the collars longitudinally within the bed to vary the central aperture between the roll-disks, as and for the purpose set forth.

6. In a head for cold-rolling shafting, the combination, with an internal conical bed, of a pair of collars adjustable longitudinally within the conical bed, having upon their adjacent sides opposed recesses forming slots to embrace conical roll-disks, the recesses having parallel obliquely disposed seats, and parallel faces upon their edges adapted to guide the rolls in their adjustment in the conical bed, substantially as herein set forth.

7. In a head for the cold-rolling of shafting, the combination, with a pair of flat conical roll-disks, of a conical bed embracing the same, and a pair of collars having obliquely and reversely disposed seats at opposite sides of their centers, fitted to the flat sides of the disks, and the collars being held at a fixed distance apart, and adjustable longitudinally within the conical bed, to vary the central aperture between the disks.

8. In a cold-rolling apparatus, the combination, with a head having an internal conical bed, of a series of conical roll-disks fitted within such conical bed and their axes inclined to the axis of the same to operate spirally upon the surface of the shafting, and bearing-wheels for the shaft set eccentrically to the axis of the bed, whereby the shaft is straightened and reduced progressively.

9. In a head for the cold-rolling of shafting, the combination, with a series of conical roll-disks, of a conical bed embracing the same, and a pair of collars having obliquely disposed seats fitted to the sides of the several disks, and the collars being held rotatably in a fixed relation to the conical bed to maintain a uniform aperture between the roll-disks, substantially as herein set forth.

10. A head, for cold-rolling shaft-bars, having a conical bed, a cage fitted to rotate therein, having slots at opposite sides of the center, with seats inclined reversely to one another, and conical roll-disks fitted to rotate in the slots, and to move to and from the axis of the cage, to operate on bars of different sizes.

11. A head, for cold-rolling shaft-bars, having a conical bed, a cage fitted to rotate therein having slots for two pairs of roll-disks, the slots being arranged at right angles to one another, to hold the disks in contact with quadrants of the conical bed and of the shaft-bar when applied to the head.

12. A head, for cold-rolling shaft-bars, having a conical bed, a series of conical roll-disks fitted to rotate upon the bed, a cage embracing the disks, and an adjustable plug fitted in the larger end of the bed and operating to hold the cage and disks in a fixed relation thereto.

In testimony whereof I have hereunto set my hand.

JOHN WESLEY HYATT.